United States Patent [19]

Schoening et al.

[11] Patent Number: 4,474,729
[45] Date of Patent: Oct. 2, 1984

[54] SUPPORT STRUCTURE FOR A PRESTRESSED CYLINDRICAL PRESSURE VESSEL

[75] Inventors: Josef Schoening, Hambruecken; Hans-Georg Schwiers, Ketsch, both of Fed. Rep. of Germany

[73] Assignee: Hochtemperatur-Reaktorbau GmbH., Cologne, Fed. Rep. of Germany

[21] Appl. No.: 261,636

[22] Filed: May 7, 1981

[30] Foreign Application Priority Data

May 16, 1980 [DE] Fed. Rep. of Germany ....... 3018818

[51] Int. Cl.³ .................... G21C 13/04; G21C 9/00
[52] U.S. Cl. .................................. 376/461; 376/285; 52/167
[58] Field of Search ............. 376/461, 285, 205, 206; 52/167; 267/141.1, 153; 188/379, 380

[56] References Cited

U.S. PATENT DOCUMENTS

| | | | |
|---|---|---|---|
| 3,018,239 | 1/1962 | Happell et al. | 376/285 X |
| 3,298,794 | 1/1967 | Mikesell et al. | 376/205 X |
| 3,362,567 | 1/1968 | Rudock | 376/205 |
| 3,867,254 | 2/1975 | Brandstetter | 376/206 |
| 4,042,651 | 8/1977 | Gaurois | 52/167 X |
| 4,062,994 | 12/1977 | Millman et al. | 188/371 X |
| 4,078,968 | 3/1978 | Golden et al. | 376/205 |
| 4,121,393 | 10/1978 | Renault et al. | 52/167 |
| 4,152,799 | 5/1979 | Koster et al. | 52/167 X |
| 4,178,811 | 12/1979 | Shepherd | 188/379 X |
| 4,308,101 | 12/1981 | Almdahl et al. | 376/461 |
| 4,348,356 | 9/1982 | Golden et al. | 376/461 |
| 4,349,184 | 9/1982 | Peterson et al. | 267/153 |

FOREIGN PATENT DOCUMENTS

| | | |
|---|---|---|
| 1559153 | 3/1970 | Fed. Rep. of Germany. |
| 2021031 | 8/1971 | Fed. Rep. of Germany. |
| 2432011 | 1/1976 | Fed. Rep. of Germany. |
| 1025859 | 4/1966 | United Kingdom. |

OTHER PUBLICATIONS

Engineering Design for Earthquake Environments, I Mech. E Conference Publications, 1978-12, Nov. 78.

*Primary Examiner*—Richard E. Schafer
*Assistant Examiner*—Daniel Wasil
*Attorney, Agent, or Firm*—Schwartz, Jeffery, Schwaab, Mack, Blumenthal & Koch

[57] ABSTRACT

A support structure for a nuclear power station having a prestressed cylindrical vessel comprising an annular ring of supports on a support wall and foundation wherein the prestressed cylindrical vessel rests on the ring of supports is disclosed. The supports, through their defined distances from each other, provide a constant cooling flow of the supports and a constant temperature over the entire operating period of the power station. This results in supports that are maintenance-free. The supports are constructed of plastic washers with steel inserts and are of sufficient height such that in the case of earthquakes, maximum vibrations of the reinforced concrete pressure vessel may be absorbed within an accurately set terminal boundary of the annular support wall.

6 Claims, 4 Drawing Figures

SUPPORT STRUCTURE FOR A PRESTRESSED CYLINDRICAL PRESSURE VESSEL

BACKGROUND OF THE INVENTION

1. Field of the Invention

The present invention concerns a support structure for a power station having a prestressed cylindrical pressure vessel. The pressure vessel is preferably of reinforced concrete. More particularly, the support structure comprises an annular ring of supports on a foundation in a specific arrangement.

2. Background of the Prior Art

Large size pressure vessels are being built in particular to house components of nuclear power stations. They consist of a pressure bearing external shell of reinforced concrete. Inside the shell, a cavity and a liner for the sealing of said cavity are found. Such pressure vessels pose problems in relation to their supporting structure. The supporting foundation must be safe with respect to shifting during earthquakes. Deformations of the concrete body due to creep and thermal stresses during operation and in the case of failure events must be absorbed. The foundations must also absorb shifting, resulting from the stresses normally encountered during operation of a nuclear reactor as well as the hypothetical stress for the reactor design.

There are known arrangements for the support of reactor pressure vessels that are capable of absorbing the radial forces generated by the thermal expansion of the pressure vessel. For example in West German Published Application No. 2 432 011 an arrangement for the thermally mobile supporting of a reactor pressure vessel is described. The pressure vessel is fastened to the holding members of a bursting shield by means of bending springs. The bursting shield surrounds the pressure vessel at a distance. The exposure to high axial deformation forces of the reactor pressure vessel is made possible within the bursting safeguard. At the same time, the limited, radial, centering support of the pressure vessel on the holding members of the supporting structure is assured. The reactor pressure vessel is, therefore, supported by means of bending springs which are attached on one end to the holding members and at the other end with the supporting members of the reactor pressure vessel such that the bending springs are stressed in tension by the axial load of the reactor pressure vessel and by its radial thermal expansion. The bending of the spring, therefore, requires that a gap be provided surrounding the reactor pressure vessel.

A further arrangement disclosed in West German Offenlegungsschrift No. 2 021 031 enables the prevention of damage by earthquakes to buildings. This arrangement has supporting bearings which consist of rocker bodies and roller plates to hold the rocker bodies. The accelerating and impact forces of an earthquake are reduced through this arrangement to magnitudes that are acceptable in terms of damage to buildings. During vibrations of the ground, movements of the foundation in the horizontal direction are resolved into vertical and horizontal components of motion by means of the rocker bodies, and the acceleration forces in the vertical direction are reduced by oscillating positions. This is achieved mainly by providing the supporting bodies with two spherical surfaces having radii larger than one-half of the height of the supporting body. In addition, the supporting body with the ascendant resting on it forms a system capable of oscillating. The disadvantage of this system is that an unsecured deflection exists in the case of maximum vibrations. Another disadvantage is the single point force application of the rocker body on the bearing shells.

A further known supporting structure for a nuclear reactor consists of several supports arranged on a solid bottom plate. A supporting jacket is placed upon these supports with the insertion of rollers and the like. This supporting structure is represented in West German Published Application No. 1 559 153. The annular body and the height of the supports permit an undefined width of swaying of the system. In the case of maximum swaying, the danger of the buckling of the annular body at a point of stress is not precluded.

SUMMARY OF THE INVENTION

Based on this state-of-the-art, it is an object of the invention to provide a supporting structure for a pressure vessel for nuclear power plants that is safe in earthquakes. It is also an object of the invention to provide the secure transfer of all static and dynamic loads to the foundation even in the case of large size pressure vessels, thus insuring a long useful life of the pressure vessel.

According to the invention, these objects are attained by arranging a plurality of support members between the pressure vessel and the annular supporting wall. The support members are preferably spaced from one another to define cooling gaps for circulation of a cooling medium. Several advantages result from this arrangement.

One advantage is a freedom from maintenance of the support structure itself for the entire life of the installation. Another is the virtual elimination of interference with the progress of construction work during initial installation. A further advantage is the conversion or absorption of the effect of vibration behavior in the case of external effects, such as earthquakes or other pressure waves, so that the primary reactor components assembled within the pressure vessel are not exposed to additional stresses.

In a further embodiment of the invention, it is advantageous to arrange the supports in two horizontal planes of the annular support wall and to provide a plurality of individual supports adjacent to each other in each plane. These two planes create a step-like configuration. The vertical surfaces of the annular support wall and of the reinforced concrete pressure vessel form a terminal limit for the hypothetical case of stress.

The individual support members advantageously comprise supports with plastic spacers and steel inserts. These are arranged along the annular support wall which in turn rests on a foundation. The support members are of the desired height comprising, for example, alternating layers of plastic spacers and steel inserts. The number of alternating layers providing the overall height of the support members is determined by the paramaters for the width of swaying to a terminal limit, for example, a support member of great height provides a long path to be covered in the case of stress. The plastic spacers also act as a lubricating film at high pressures.

In an alternate embodiment of the invention, a plastic support member is cast into a single block with the steel inserts embedded therein. This cast plastic block lends strength to the steel inserts and thus acts as a stabilizer.

Other material capable of of being cast is also suitable for forming the support members.

The utilization of individual support members makes possible the uniform distribution of the support members over the support planes of the annular supporting wall. Cooling gaps are thereby created between the individual support members assuring a flow of cooling media for maintaining the support members within safe operating temperature parameters. There is, therefore, no impermissible thermal stressing over the entire life of the installation.

In an advantageous embodiment, the lower surface support of the reinforced concrete pressure vessel has a steel casing. This casing serves as the form for the concrete of the vessel during the construction phase and later it simultaneously covers the top side of the support members. In this manner, the construction work may be continued without special structural measures and interruptions.

Similarly, the annular support wall is provided with a layer of mortar upon which the support members are positioned. The mortar layer is suitable to optimize the height of the supports for a favorable vibration behavior and to equalize potential structural tolerances.

In a further advantageous arrangement of the support members on two support planes, the inner support plane is established on the upper part of the annular support wall and the outer support plane on the lower part of the annular support wall. In this fashion, a terminal limitation is provided by the vertical step riser surface between the support planes.

BRIEF DESCRIPTION OF THE DRAWINGS

The support structure according to the invention is represented in the drawings.

The figures show in detail.

DETAILED DESCRIPTION OF THE PREFERRED EMBODIMENTS

Figure 1:
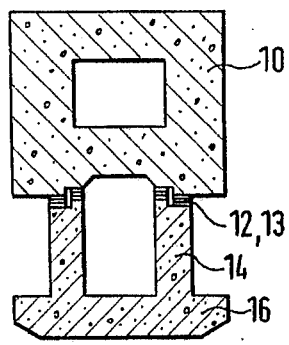
FIG. 1 depicts the reinforced concrete pressure vessel in a cross-section with the annular support wall based on the foundation.

FIG. 1 shows a reinforced concrete pressure vessel in cross-section with its internal cavity for housing the core components of the reactor. The components are not shown in the drawings as they may be any high temperature reactor, gas turbine assembly, recuperator, precooler, intermediate cooler and the like. Examples of such devices are more completely disclosed in U.S. Pat. Nos. 4,045,285; 4,118,276 and 4,175,001, the disclosures of which are incorporated herein by reference. The reinforced concrete pressure vessel rests on the annular support wall 14, which is based on the foundation 16. Between the annular support wall 14 and the reinforced concrete pressure vessel 10, the two support members 12, 13 are located in two support planes 24, 26 (see FIG. 3). The upper support plane 24 is in the internal space of the annular support wall 14. The lower support plane 26 is arranged outside on the annular support wall 14.

Figure 2:
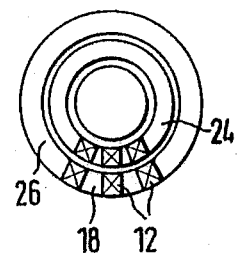
FIG. 2 shows a top view of the support planes, in a cross-section located through the support planes between the pressure vessel and the annular support wall.

FIG. 2 shows the circular configuration of the annular support wall 14 with the two support planes 24, 26. Upon it, the support members 12, 13 are resting in a circular distribution. The distribution of the support members 12, 13 is chosen so that cooling gaps 18 are created between the support members 12, 13. These cooling gaps are necessary, as the flow of cooling medium into the area 28 maintains the support members 12, 13 at a uniform temperature. FIG. 2 demonstrates the cooling gap 18 between the support members 12, 13 together with the two planes 24, 26, upon which the support members 12, 13 are distributed.

Figure 3:
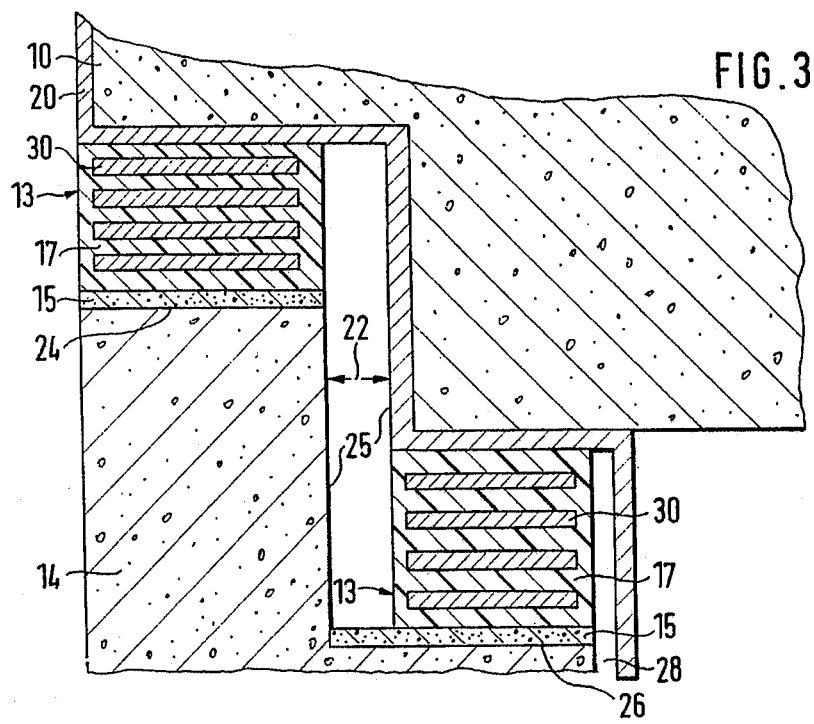
FIG. 3 illustrates an enlargement of the area wherein the annular support wall, two support members and the pressure vessel are in communication.

FIG. 3 shows an enlargement of the area of communication of the annular support wall 14, together with the support members 13 and the reinforced concrete pressure vessel 10. The support members 13 are resting on a layer of mortar 15 that has been applied to the annular support wall 14. The upper boundary of the supports is constituted by the steel casing 20 of the reinforced concrete pressure vessel 10. The side boundary 25 comprises the stepped configuration of the two planes 24 and 26. This boundary 25 also provides space 28 for the flow of cooling medium. The support members 13 contain a plurality of steel inserts 30 which absorb all of the stresses generated over their large surfaces and pass them on through the annular support wall 14 to the foundation 16. It may be seen further that the steel casing 20, representing the bottom closure of the reinforced concrete pressure vessel, is extended past the lower support so that the cooling flow in area 28 is not interrupted. The overall configuration of the support members in this embodiment is block-shaped. Such blocks are molded plastic 17 with metal plates embedded therein. The height of the blocks determines the magnitude of the shifting width 22.

Figure 4:
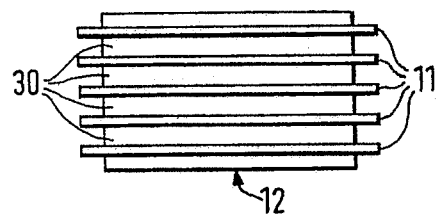
FIG. 4 demonstrates an embodiment of the support members comprising plastic spacers and steel inserts.

FIG. 4 shows an alternate embodiment of a support member 12. Therein, plastic spacers 11 and steel inserts 30 are placed upon each other. The spacers act as a lubricant at elevated pressures. The placement of the individual layers upon each other results in the stable support shape 12. The height of the individual layers of plastic spacers and steel inserts determines the size of the shifting width 22. In other words, the greater the number of individual layers stacked upon each other, the larger the shifting width 22.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

We claim:

1. A support structure for a prestressed cylindrical vessel of a nuclear power station comprising:
    a foundation;
    an annular support wall fixedly mounted on said foundation; and
    a plurality of support members comprising uniformly spaced composite plastic spacers with steel inserts arranged as individual supports on two horizontal support planes along said annular support wall, said support members in supporting connection with said prestressed cylindrical vessel, said support members on one support plane are disposed at a different level relative to the support members on the other support plane, said support members on their respective support planes form the shape of two concentric discontinuous annuli at a distance from one another to define a cooling gap for circulation of a cooling medium therein.

2. The support structure of claim 1 further comprising a steel casing between said support members and said prestressed cylindrical vessel.

3. The support structure of claim 1 further comprising a layer of mortar between said support members and said annular support wall.

4. A support structure for a prestressed cylindrical vessel of a nuclear power station comprising:
    a foundation;
    an annular support wall fixedly mounted on said foundation; and
    a plurality of support members comprising uniformly spaced plastic blocks with steel spacers arranged as individual supports on two horizontal support planes along said annular support wall, said support members in supporting connection with said prestressed cylindrical vessel, said support members on one support plane are disposed at a different level relative to the support members on the other support plane, said support members on their respective support planes form the shape of concentric discontinuous annuli at a distance from one another to define a cooling gap for circulation of a cooling medium therein.

5. The support structure of claim 4 further comprising a steel casing between said support members and said prestressed cylindrical vessel.

6. The support structure of claim 4 further comprising a layer of mortar between said support members and said annular support wall.

* * * * *